US010074356B1

(12) United States Patent
Sarkar et al.

(10) Patent No.: US 10,074,356 B1
(45) Date of Patent: Sep. 11, 2018

(54) CENTRALIZED CONTROL OF MULTIPLE ACTIVE NOISE CANCELLATION DEVICES

(71) Applicant: Plantronics, Inc., Santa Cruz, CA (US)

(72) Inventors: Shantanu Sarkar, San Jose, CA (US); Cary Bran, Seattle, WA (US); Joe Burton, Los Gatos, CA (US); Philip Sherburne, Morgan Hill, CA (US); John H Hart, Saratoga, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/455,022

(22) Filed: Mar. 9, 2017

(51) Int. Cl.
*G06F 3/16* (2006.01)
*G10K 11/178* (2006.01)
*G08B 17/00* (2006.01)

(52) U.S. Cl.
CPC ............ *G10K 11/178* (2013.01); *G08B 17/00* (2013.01); *G10K 11/1788* (2013.01); *G10K 2210/1081* (2013.01); *G10K 2210/12* (2013.01); *G10K 2210/3214* (2013.01)

(58) Field of Classification Search
CPC .. G10K 11/175; G10K 3/825; G10K 2203/12; G10L 2015/088; H04R 2460/01
USPC ... 381/372, 370, 73.1, 57, 74, 56, 104, 71.6; 700/94
See application file for complete search history.

(56) References Cited

U.S. PATENT DOCUMENTS

| | | | | |
|---|---|---|---|---|
| 8,744,113 | B1 | 6/2014 | Rickards | |
| 9,398,367 | B1 | 7/2016 | Scott et al. | |
| 2003/0144848 | A1* | 7/2003 | Roy | H04R 27/00 704/500 |
| 2007/0177753 | A1 | 8/2007 | Weinans et al. | |
| 2009/0082071 | A1 | 3/2009 | Hicks, III | |
| 2011/0002477 | A1 | 1/2011 | Zickmantel | |
| 2011/0077055 | A1 | 3/2011 | Pakula et al. | |
| 2011/0206217 | A1 | 8/2011 | Weis | |
| 2012/0274502 | A1 | 11/2012 | Hyde et al. | |
| 2012/0280824 | A1 | 11/2012 | Zelepugas | |
| 2014/0044269 | A1 | 2/2014 | Anderson | |
| 2014/0314242 | A1 | 10/2014 | Gollbach et al. | |
| 2015/0358717 | A1 | 12/2015 | Johnston et al. | |
| 2016/0125869 | A1* | 5/2016 | Kulavik | G10K 11/178 381/71.6 |
| 2016/0188285 | A1* | 6/2016 | Luk | G06F 3/165 700/94 |

* cited by examiner

*Primary Examiner* — Melur Ramakrishnaiah
(74) *Attorney, Agent, or Firm* — Jeremy S. DesRosier

(57) ABSTRACT

The invention relates to a method for centralized control of multiple active noise cancellation devices. The method includes identifying a trigger event. Also, the method includes identifying, in response to identifying the trigger event, two or more zones of a mapped area. Further, the method includes identifying, based on the two or more zones, two or more devices. Still yet, the method includes transmitting a command to disable active noise cancellation on each of the two or more devices.

11 Claims, 8 Drawing Sheets

CENTRALIZED CONTROL OF MULTIPLE ACTIVE NOISE CANCELLATION DEVICES

FIELD

The present disclosure relates generally to the field of acoustic noise reduction. More particularly, the present disclosure relates to dynamically managing the active noise cancellation technologies of environmental sound masking and personal audio devices.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As work environments become increasingly dense, employees find themselves working closer and closer together. Although such arrangements can improve collaboration between employees, they may also increase distractions. In particular, various activities, such as conversations, phone calls, and music, may now be within earshot of a greater number of people. In turn, workers and employers have sought ways to minimize distractions and maintain productivity. Typically, such solutions come in the form of headphones and environmental sound masking. Further complicating matters, headphones and sound masking may employ active noise cancellation technologies that emit acoustics to cancel environmental noises. For example, headphones may generate anti-phase acoustic signals, and sound masking may be specifically configured to render unintelligible human speech outside of a given radius. However, many active noise cancellation technologies are not able to discern the content of such noises, or otherwise discriminate between which noises are cancelled. As such, these technologies cancel almost all noise regardless of the source or content. There are a number of circumstances in which a person should hear the noises within his or her environment.

SUMMARY

In general, in one aspect, the invention relates to a method for centralized control of multiple active noise cancellation devices. The method includes identifying a trigger event. Also, the method includes identifying, in response to identifying the trigger event, two or more zones of a mapped area. Further, the method includes identifying, based on the two or more zones, two or more devices, and transmitting a command to disable active noise cancellation on each of the two or more devices.

In general, in one aspect, the invention relates to a method for centralized control of multiple active noise cancellation devices. The method includes identifying a trigger event. Also, the method includes identifying, in response to identifying the trigger event, at least one zone of a mapped area. Further, the method includes identifying, based on the at least one zone of the mapped area, two or more devices, and transmitting a command to disable active noise cancellation on the two or more devices.

In general, in one aspect, the invention relates to a system for centralized control of active noise cancellation. The system includes an area mapping of an indoor environment, a keyword library, a listing of user and device associations, a listing of device locations, at least one processor, and a memory coupled to the at least one processor. The memory stores instructions that, when executed by the at least one processor, cause the at least one processor to perform a process. The process includes receiving metadata that identifies a keyword of the keyword library, and, based on the metadata, identifying a trigger event. Also, the process includes identifying, in response to identifying the trigger event and using the area mapping, two or more zones of the indoor environment. Further, the process includes identifying, based on the two or more zones, and using the listing of user and device associations and the listing of device locations, two or more devices. Still yet, the process includes transmitting a command to disable active noise cancellation on each of the two or more devices.

The details of one or more implementations are set forth in the accompanying drawings and the description below. Other features will be apparent from the description and drawings, and from the claims.

DETAILED DESCRIPTION

Figure 1:
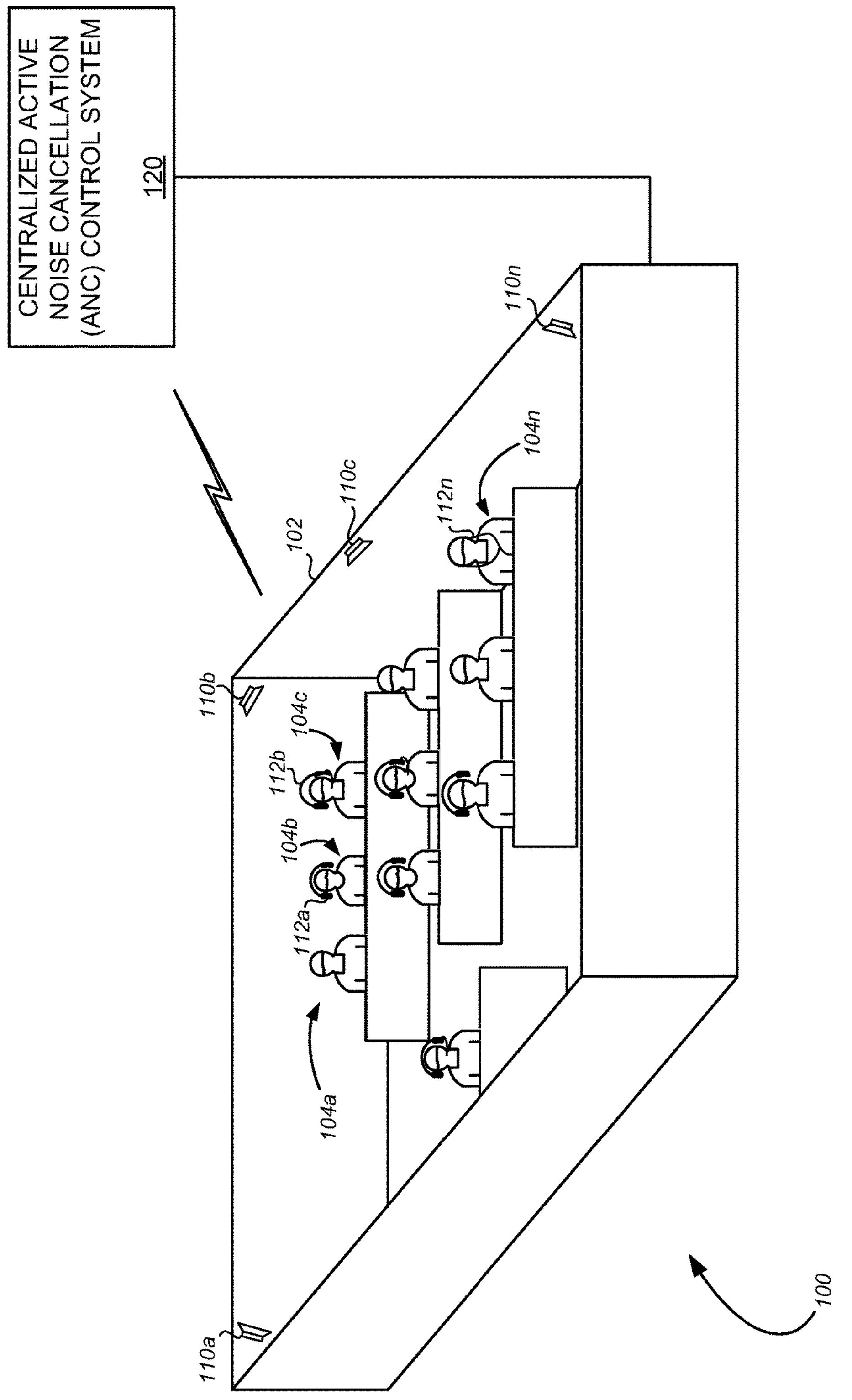
FIG. 1 depicts an environment for the centralized control of multiple active noise cancellation devices, in accordance with one or more embodiments of the invention.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between like-named the elements. For example, a first element is distinct from a second element, and the first element may encompass more than one element and succeed (or precede) the second element in an ordering of elements.

As work environments have become increasingly dense, individuals have sought ways to remove distractions and maintain their focus on tasks. Consequently, many individuals now wear headphones (e.g., circumaural headphones, in-ear headphones, etc.) or a headset while working. These devices can physically occlude the hearing of a wearing individual. Moreover, these devices may include active noise cancellation (ANC) technology operable to generate anti-phase noise that mitigates the auditory perception of environmental noise. Further complicating matters, some workplaces have installed sound masking systems. Sound masking systems introduce constant background noise in a space in order to reduce speech intelligibility, increase speech privacy, increase acoustical comfort, and otherwise reduce the perception of environmental noise. As a result, multiple ANC technologies may be operational in a single space at any given moment. The multiple layers of ANC technologies may impede the ability to convey information, and may hinder the collaborative efforts of individuals working within such a space.

In general, embodiments of the invention provide systems and methods for the centralized control of multiple ANC technologies. Such systems actively monitor an environment to identify relevant events, and leverage knowledge of the environment to determine which technologies should be suspended (i.e., temporarily disabled) in response to particular events. These systems and methods may enable or disable all or some portion of a sound masking system, as well as monitor presence and device information. By way of such a central control mechanism, user collaboration and productivity may be increased by automatically and dynamically suspending ANC technologies, thereby facilitating interpersonal interactions. Moreover, by way of such a central control mechanism, user safety may be increased, such as, for example, by enabling the suspension of ANC technologies in response to an interrupt or control signal received from an external source.

FIG. 1 shows an environment 100 implementing a centralized ANC control system 120 according to one or more embodiments. Although the elements of the environment 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1 may be omitted, repeated, and/or substituted. Accordingly, various embodiments may lack one or more of the features shown. For this reason, embodiments of the invention should not be considered limited to the specific arrangements of elements shown in FIG. 1.

As depicted in FIG. 1, the environment 100 includes an area 102 with multiple ANC devices (i.e., personal audio devices 112 and speakers 110) under the control of a centralized ANC control system 120. The area 102 includes any physical space that may be occupied by one or more persons 104 at a given time. The area 102 may include one or more rooms in a building. Each room may be partitioned by one or more walls or dividers, and may include a floor and a ceiling. Accordingly, the area 102 may include offices, an auditorium, an industrial space, a factory floor, a co-working workspace, and/or a residence. As depicted in FIG. 1, numerous persons 104 simultaneously occupy the area 102 while engaged, independently or cooperatively, in various tasks. In one or more embodiments, the persons 104 may be employees in office, call center, assembly line, etc. Accordingly, the persons 104 may be working at computers, participating in telephone calls, reviewing documents, assembling articles, etc.

Due to the densification of the environment 100, multiple persons 104 have elected to utilize personal audio devices 112 in order to reduce auditory distractions and better focus on their tasks. Each of the personal audio devices 112 include any device that a person 104 may wear, or otherwise utilize, for independently listening to audio signals. The audio signals may include, for example, music or telephone calls. In one or more embodiments, a personal audio device 112 may include a headphone or headphones, a headset, earphones, or earbuds. Accordingly, each personal audio device 112 may include a speaker and a microphone. For example, a first person **104*b* is shown using a first personal audio device 112*a* embodied as a pair of headphones, while a second person 104*c* is shown using a second personal audio device 112*b* embodied as a headset with a boom microphone, and a third person 104*n* is shown to be wearing a third personal audio device 112*n* embodied as a set of in-ear earphones. As a result, the hearing of one or more of the persons 104 in the area 102 may be occluded. Such depictions are intended to be illustrative and should not be construed as limiting in any manner. Moreover, one or more of the personal audio devices 112*a*-112*n* may include ANC technology operable to generate anti-phase noise for mitigating the auditory perception of environmental noise, such as the noises made by surrounding persons 104. Consequently, a first person 104*a* may not hear another person 104*n*** calling their name, or another important auditory signal, such as a fire alarm or broadcast announcement.

Although, not shown in FIG. 1, is it understood that the personal audio devices 112 may be connected to computing devices, such as computers, phones, and multimedia audio devices.

Still yet, the area 102 is illustrated to include speakers 110 for masking open space noise. In one or more embodiments, the speakers 110 may output a sound for reducing the intelligibility of speech of the users 104. For example, the speakers 110 may reproduce the sound of flowing water or rain. As described herein, ANC comprises any technique that includes the emission of a sound specifically designed to cancel another sound. Accordingly, the masking of speech and other open space noise by the speakers 110 is assumed to comprise an ANC technique.

In one or more embodiments, the speakers 110 may be installed proximate to a ceiling and/or wall. For example, a first speaker **110*a* may be installed in a wall of the area 102, a second speaker 110*b* may be hung from a ceiling of the area 102, and a third speaker 110*c* may be installed above a suspended ceiling of the area 102. Without the speakers 110, and due to the generally open layout of the area 102, the speech of a given person 104 may be distracting to the other persons 104 in the area 102**.

Due to the masking of open space noise by the speakers 110, and the use of personal audio devices 112, the acoustic comfort of the persons 104 may be increased, thereby increasing focus and improving speech privacy. Unfortunately, however, due to the ANC of the personal audio devices 112 and the speakers 110, it may be difficult for the persons 104 to communicate with each other. Moreover, due to the ANC of the personal audio devices 112 and the speakers 110, the persons 104 may have difficulty hearing announcements or alerts that are broadcast in the area 102.

In one or more embodiments, a centralized ANC control system 120 may be communicatively coupled to the speakers 110 and the personal audio devices 112, whether directly or indirectly, by way of wired or wireless transmission media. As described herein, the centralized ANC control system 120 includes any computerized system operable suspend the ANC technologies of the personal audio devices 112 and the speakers 110. Accordingly, the centralized ANC control system 120 may dynamically enable and disable ANC technologies of the personal audio devices 112 and the speakers 110 in a manner that is responsive to the physical interactions of the persons 104 within the area 102.

In one or more embodiments, the centralized ANC control system 120 may send commands to the personal audio devices 112 for enabling or disabling the ANC active thereon. As described herein, the centralized ANC control system 120 may communicate directly with the personal audio devices 112, or rely on host computing devices for communicating the commands to the personal audio devices 112 for enabling or disabling the ANC active thereon. In one or more embodiments, the centralized ANC control system 120 may enable or disable the ANC of one or more of the speakers 110. For example, the centralized ANC control system 120 may temporarily disable the open space sound masking audio reproduced by one or more of the speakers 110. The centralized ANC control system 120 may be operable to suspend the ANC of some subset of the speakers 110, without suspending the ANC of the other speakers 110, thereby facilitating the communication between two or more persons 104, without interrupting other persons 104 in the area 102.

Accordingly, the centralized ANC control system 120 may improve the productivity of the persons 104, while reducing the frustrations inherent to capturing the attention of an acoustically isolated individual. Additionally, the dynamic enablement and disablement of ANC technologies by the centralized ANC control system 120 may improve the safety of the persons 104, by reducing the acoustic isolation of the persons 104 during broadcast messages and alarm signals.

As described below, the centralized ANC control system 120 may operate responsive metadata received from devices that have been configured to monitor the interactions of the persons 104 in the area 102. The metadata may be received from any device that receives a signal from a microphone within the area 102. The metadata includes any data that describes a communication, electronic or verbal, initiated by a person in the area 102. The metadata may describe a condition or circumstance associated with the communication. Moreover, as described below, the centralized ANC control system 120 may operate responsive to external triggers that are received from systems that reside primarily outside of the area 102.

Figure 2:
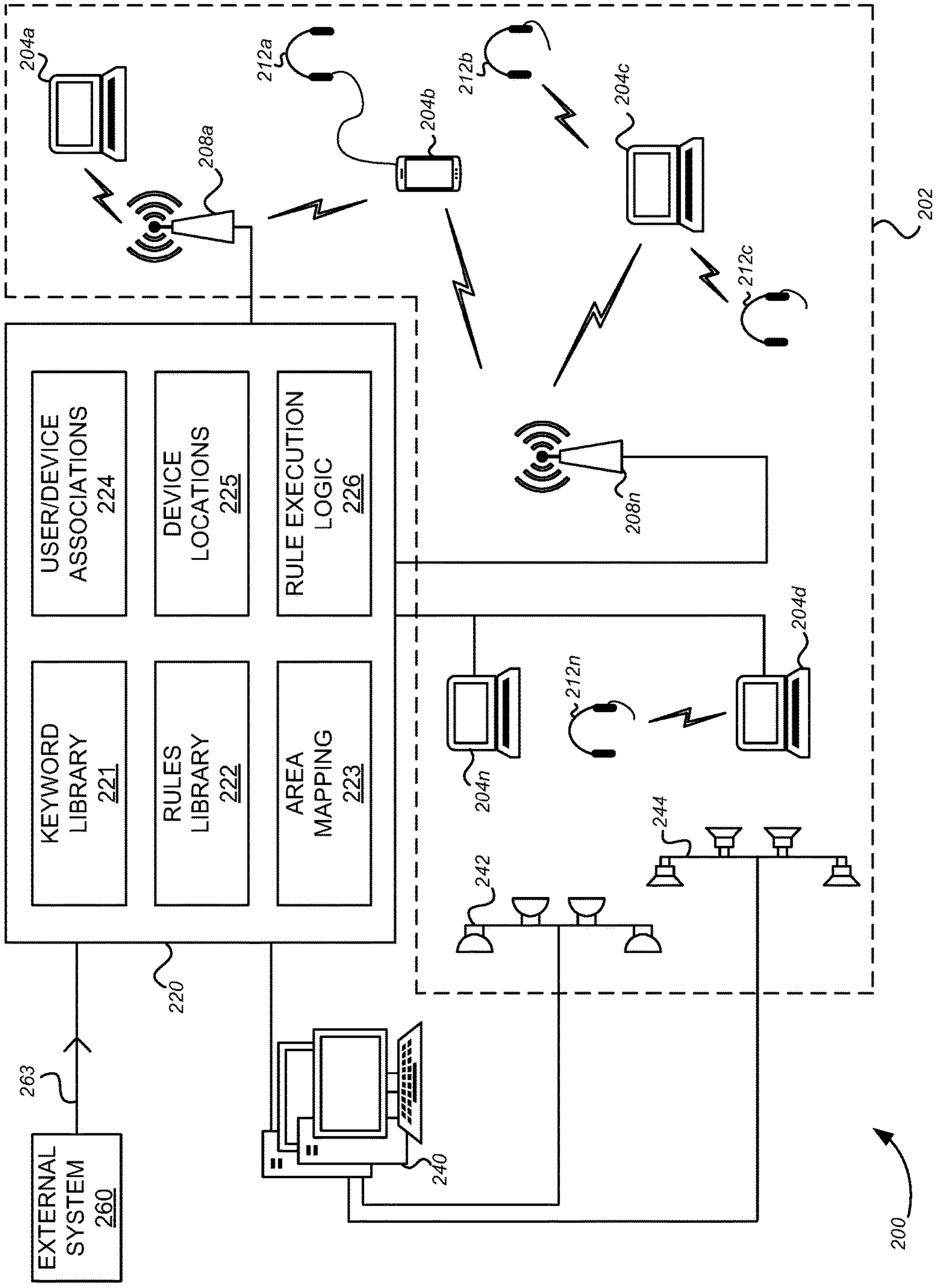
FIG. 2 depicts a system for the centralized control of multiple active noise cancellation devices, in accordance with one or more embodiments of the invention.

FIG. 2 depicts a system 200, according to one or more embodiments. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

As depicted in FIG. 2, the system 200 is shown to include a centralized ANC control system 220, computing devices 204, personal audio devices 212, and a sound masking control system 240, which includes microphones 242 and speakers 244. The computing devices 204, personal audio devices 212, microphones 242, and speakers 244 are shown operating in an area 202. In one or more embodiments, the area 202 may include a room, or multiple rooms, of a mapped indoor environment, such as an office building, residence, or factory.

In one or more embodiments, a computing device 204 includes any device for storing and processing data that is in communication, either directly or indirectly, with the centralized ANC control system 220. In one or more embodiments, the computing devices 204 may communicate with the centralized ANC control system 220 over a network. The network may include any private or public communications network, wired or wireless, such as a local area network (LAN), wide area network (WAN), or the Internet. Accordingly, the system 200 is shown to include wireless access points 208. The wireless access points 208 enable Wi-Fi devices, such as the computing devices 204, to communicate with the centralized ANC control system 220. In one or more embodiments, the computing devices 204 may include one or more desktop computers, one or more laptop computers, one or more cellular phones (e.g., a smartphone), and one or more tablet computers.

Accordingly, although not shown for purposes of simplicity and clarity, it is understood that each of the computing devices 204 may include one or more of a processor, memory, a transceiver, a microphone, a speaker, an output device, a user-operable control, and a power supply. The processor may execute applications stored in the memory (e.g., a telephony application, an instant messaging application, an email application, a keyword matching application, etc.). The processor may include digital signal processors, analog-to-digital converters, digital-to-analog converters, and the like. The processor may communicate with other elements of the computing device 204 over one or more communication busses. An output device may include a display, haptic device, and the like. A user-operable control may include a button, slide switch, capacitive sensor, touch screen, etc. A transceiver may include a Bluetooth transceiver, a Wi-Fi transceiver, etc.

As illustrated in FIG. 2, the computing devices 204 (and presumably the persons using the computing devices 204) are located within the area 202 managed by the centralized ANC control system 220. For example, the devices 204 may be located within an indoor environment, such as a commercial office that includes multiple rooms. In one or more embodiments, any area managed by the centralized ANC control system 220 may have been previously mapped in a manner that facilitates such management. Such mapping includes any operation that results in the generation of topology and location data used for management purposes.

In one or more embodiments, a computing device 204 may be communicatively coupled with the centralized ANC control system 220 over a wired or wireless link. For example, computing devices 204*a*, 204*b*, and 204*c* are shown to be in communication with the centralized ANC control system 220 over wireless links; and computing devices 204*d* and 204*n* are shown to be in communication with the centralized ANC control system 220 over wired links. In one or more embodiments, a personal audio device 212 may be communicatively coupled with a computing device 204 over a wired or wireless link. For example, as depicted in FIG. 2, a first personal audio device 212*a* is shown coupled to a first personal computing device 204*b* by way of a wired link, a second personal audio device 212*b* is shown coupled to a second personal computing device 204*c* by way of a wireless link, and a third personal audio device 212*n* is shown coupled to a third personal computing device 204*d* by way of a wireless link. Examples of wired links between a computing device 204 and the centralized ANC control system 220 include Ethernet, Token Ring, ISDN, DSL, cable, power line networks, etc. A wired link between a personal audio device 212 and a computing device 204 may include, for example, a universal serial bus (USB) connection. Additionally, a wireless link may include, for example, a Bluetooth link, a Digital Enhanced Cordless Telecommunications (DECT) link, a cellular link, a Wi-Fi link, etc.

Although not shown for purposes of simplicity and clarity, it is understood that each of the personal audio devices 212 may include one or more of a processor, memory, a transceiver, a microphone, a speaker, an output device, a user-operable control, and a power supply. The processor may execute applications stored in the memory (e.g., a keyword matching application, etc.). The processor may include digital signal processors, analog-to-digital converters, digital-to-analog converters, and the like. The processor may communicate with other elements of the personal audio device 212 over one or more communication busses. An output device may include a display, haptic device, and the like. A user-operable control may include a button, slide switch, capacitive sensor, touch screen, etc. A transceiver may include a Bluetooth transceiver, a Wi-Fi transceiver, etc.

Each of the personal audio devices 212 may include ANC technology. Moreover, each of the personal audio devices 212 may be operable to, in response to commands originating from the centralized ANC control system 220, enable and disable the ANC technology. In this way the centralized ANC control system 220 may temporarily disable the ANC of one or more of the personal audio devices 212.

In one or more embodiments, the centralized ANC control system 220 maintains environmental and device data to facilitate the dynamic suspension of ANC on devices operating in the area 202. To this end, and as illustrated in FIG. 2, the centralized ANC control system 220 stores a keyword library 221, a rules library 222, an area mapping 223, a listing of user/device associations 224, and a listing of device locations 225. Additionally, the centralized ANC control system 220 includes rule execution logic 226. The rule execution logic may include a hardware processor that is communicatively coupled to memory and storage media. One or more of the keyword library 221, the rules library 222, the area mapping 223, the listing of user/device associations 224, and the listing of device locations 225 may be stored to the memory and/or storage media, for use during execution by the rule execution logic 226 of the rules in the rules library 222.

As described herein, the sound masking control system 240 includes a noise level management application that receives audio signals from the microphones 242 in the area 202, and transmits sound masking audio signals to the speakers 244 in the area 202. In one or more embodiments, the sound masking control system 240 may operate under the control of the centralized ANC control system 220 to suspend (i.e., temporarily disable) the ANC of the speakers 244. In one or more embodiments, the microphones 242 are located throughout the area 202 to record the utterances of persons located within the area 202. Accordingly, one or more of the microphones 242 may record a first person calling out the name of a second person in the area 202. These audio signals may be returned by the microphones 242 to the sound masking control system 240 for processing by the sound masking control system 240. In one or more embodiments, upon receiving an audio signal from one of the microphones 242, the sound masking control system 240 may process the audio signal according to the contents of the keyword library 221 of the centralized ANC control system 220. In particular, the sound masking control system 240 may identify, within a user's speech, the occurrence of a keyword included in the keyword library 221.

As described herein, the keyword library 221 includes a listing of keywords that may be used to trigger the suspension of ANC within the area 202. In one or more embodiments, the keyword library 221 may include names of persons. For example, the keyword library 221 may include the names of persons that may be physically located within the area 202. In particular, if the area 202 includes one or more offices of a company, then the keyword library 221 may include the names of persons that work for the company (i.e., "John" and "Harry"). In one or more embodiments, a keyword may comprise one or more words, such as a phrase. Accordingly, the keyword library may include one or more predetermined key phrases. For example, the keyword library 221 may include phrases such as "do you have a minute to discuss something?," "is now a good time to talk?," "are you available for a quick discussion?," etc. In one or more embodiments, the keyword library 221 may include specific control terminology. For example, the keyword library 221 may include phrases such as "stop all ANC," "suspend ANC," or "resume ANC." As described herein, the contents of the keyword library 221 may be used by the sound masking control system 240, the computing devices 204, and the personal audio devices 212 to identify events that may be used for triggering the suspension of ANC. In one or more embodiments, each keyword in the keyword library 221 may be associated with a keyword identifier. The keyword library 221 may be maintained as a table, as shown below at Table 1. For example, as shown in Table 1, the keyword "John" is associated with the keyword identifier "001." Of course, the keyword library 221 may be maintained in any suitable format, such as, for example, a relational database.

TABLE 1

| Keyword ID | Keyword |
|---|---|
| 001 | John |
| 002 | Harry |
| 003 | can you chat |
| 004 | a minute to talk |

In one or more embodiments, the contents, or some portion thereof, of the keyword library 221 may be pushed out to any of the computing devices 204, the personal audio devices 212, and the sound masking control system 240. Accordingly, the sound masking control system 240, the computing devices 204, and the personal audio devices 212 may actively monitor the speech of persons in the area 204 for phrases and names that match one or more keywords in the keyword library 221. More specifically, the microphones 242 may be used by the sound masking control system 240 to actively monitor the utterances of persons in the area 202. Similarly, microphones of the computing devices 204 and the personal audio devices 212 may be used by software executing on the computing devices 204 and the personal audio devices 212, respectively, to monitor the utterances of associated individuals in a similar manner. Additionally, the computing devices 204 may actively monitor text-based communication media, such as instant messaging applications executing thereon, for phrases and names that match one or more keywords in the keyword library 221. Specific examples of such instant messaging applications include, for example, Google® Hangouts or Microsoft® Skype®.

As described herein, the rules library 222 includes one or more rules for governing the suspension of ANC. Accordingly, each rule may include a determinate function that operates on received input to identify a trigger event. In response to identifying a trigger event based on a rule, the ANC of one or more devices in the area 202 may be suspended (i.e., temporarily disabled). In one or more embodiments, the input may be received from the sound masking control system 240, the personal audio devices 212, and the computing devices 204. In one or more embodiments, the input may include metadata that describes environmental conditions in the area 202, and/or describes interactions occurring between persons in the area 202. For example, the metadata may include a power level of an audio signal detected in the area 202 by one of the microphones 242, a microphone of a computing device 204, or a microphone of a personal audio device 212. More specifically, for example, a microphone may report a current volume level in decibels (e.g., 50 dB, 67 dB, 95 dB, etc.). Accordingly, in one or more embodiments, a rule may include a condition used to evaluate received metadata. As described below, the condition may be based on distance (e.g., 3 meters, 10 meters, etc.), and/or based on a current volume level.

As another example, the metadata may indicate that a keyword of the keyword library 221 has been detected. The keyword may be detected by a microphone as an utterance from a person in the area 202, or the keyword may be detected within an electronic message sent between two computing devices 204 in the area 202. As an option, the metadata may indicate which keyword was detected. The metadata may contain the particular keyword that has been detected, or an identifier of the keyword. Also, the metadata may identify the source of detection of the keyword. For example, the metadata may identify a device that was used to detect the keyword, such as a personal audio device 212, a computing device 204, or one of the microphones 242. Such a device identification may include any designator that serves to uniquely identify a device in the area 202, such as, for example, a serial number, a universally unique identifier (UUID), a media access control (MAC) address, or internet protocol (IP) address.

As described herein, the listing of user/device associations 224 includes any data record that correlates a device in the area 202 with a person. For example, the listing of user/device associations 224 may identify who is using a particular computer, headset, smartphone, or tablet. In one or more embodiments, the listing of user/device associations 224 may be maintained as a table, as shown below at Table 2. Using the contents of Table 2, it may be determined which device is currently being used by which person. For example, from Table 2 it can be determined that John is currently using a smartphone with a MAC address of "56:78:A4:76:89:F2," and a tablet with a MAC address of "A6:3B:94:87:5A:2D." Of course, the user/device associations may be maintained in any suitable format, such as, for example, a relational database, etc.

TABLE 2

| Device ID | Device Type | User |
|---|---|---|
| 56:78:A4:76:89:F2 | Smartphone | John |
| A6:3B:94:87:5A:2D | Tablet | John |
| 2F:96:FB:D3:03:17 | Laptop | Harry |
| E7:F6:AA:5E:EE:19 | Headset | Harry |

In one or more embodiments, the centralized ANC control system 220 may maintain, for a device identified in the user/device associations 224, information such as a model number, firmware version, serial number, capabilities (e.g., ANC capabilities), etc. for the device. Also, the centralized ANC control system 220 may maintain, for a device identified in the user/device associations 224, whether ANC is currently enabled or disabled on the device.

As described herein, the area mapping 223 includes any data record that provides a physical or spatial relationship between zones of the area 202. In one or more embodiments, the area 202 may be divided into multiple zones, where each zone is a physical or virtual partition of the area 202. As an option, the zones of the area 202 may be generally rectangular, with fixed or variable sizes. For example, the area 202 may be divided into numerous zones that each measure approximately 2 meters×3 meters, 4 meters×4 meters, etc. As another example, the area 202 may be divided into numerous zones, where one or more of the zones corresponds to an entire room in the area 202, a cubicle in the area 202, an office in the area 202, etc. Each zone of the area 202 may be associated with a unique identifier. For example, a first partition of the area 202 may be identified as "Zone 1," a second partition of the area 202 may be identified as "Zone 2," and a third partition of the area 202 may be identified as "Zone 3." In one or more embodiments, the area 202 may be divided using a Cartesian coordinate system, where each point in the Cartesian coordinate system is associated with a different zone. Accordingly, in such embodiments, the area mapping 223 may serve to translate a given zone into a point or coordinate that provides for a definite spatial relationship relative to any other zone. For example, the area mapping 223 may be maintained as a table, as shown below at Table 3. Using the contents of Table 3, it may be determined that Zone 1 at (0,0) is adjacent to both Zone 2 at (0,1) and Zone 4 at (1,0). Moreover, using the contents of Table 3, it may be determined that Zone 2 occupies a space between, and adjacent to, both Zones 1 and 3. Of course, the area mapping 223 may be maintained in any suitable format, such as, for example, a relational database, a graph database, etc.

TABLE 3

| Location | Zone |
|---|---|
| 0,0 | 1 |
| 0,1 | 2 |
| 0,2 | 3 |
| 1,0 | 4 |

In one or more embodiments, the area mapping 223 may include the dimensions of the zones tracked within, in order to facilitate the calculation of a distance between two zones.

As described herein, the listing of device locations 225 includes location information for one or more of the computing devices 204, the personal audio devices 212, the microphones 242, and the speakers 244 in the area 202. In one or more embodiments, and as described above, the area 202 may be mapped in a manner that divides the area 202 into multiple zones. In such embodiments, the listing of device locations 225 may correlate each device with the zone it has been identified to be located within, or otherwise associated with. In one or more embodiments, the location of a device may be determined based on the wireless access point 208 to which it is connected. For example, if a first computing device 204*a* is connected by way of a wireless link to a first wireless access point 208*a*, and the range of the first wireless access point 208*a* is limited such that it only transmits and receives within Zone 1, then it may be determined that the first computing device 204*a* is located in Zone 1. In one or more embodiments, the location of a device may be determined by applying triangulation algorithms to a wireless signal that the device uses to establish a wireless link. For example, using the received signal strength of a Bluetooth or Wi-Fi signal of a second computing device 204*b*, as received by the wireless access points 208, the centralized ANC control system 220 may identify a zone of the area 202 in which the second computing device 204*b* is presently located. In one or more embodiments, the location of a device may be determined based on the port to which the device is connected. For example, if a third computing device 204*d* is connected to an Ethernet port at a fixed location in Zone 4, then it may be determined that the third computing device 204*d* is also located in Zone 4.

In one or more embodiments, the location of a personal audio device 112 may be determined based on a wireless access point 208 to which the personal audio device 112 is connected, or the location of a personal audio device 112 may be determined by applying triangulation algorithms to a wireless signal of the personal audio device 112. In one or more embodiments, the location of a personal audio device 112 may be determined based on a computing device 204 to which the personal audio device 112 is connected. For example, if it is determined that the second computing device 204*b* is located in Zone 3, and a particular personal audio device 212*a* is connected to the second computing device 204*b*, then the personal audio device 212*a* may also be correlated with Zone 3. It is understood that, in one or more embodiments, a personal audio device 212 may be communicatively coupled to the centralized ANC control system 220, without the presence of a computing device 204 as an intermediary.

In one or more embodiments, the locations of individual microphones of the microphones 242 and individual speakers of the speakers 244 may also be recorded within the listing of device locations 225. For example, if the speakers 244 includes four different speakers, then each speaker may be independently associated with a zone in the listing of device locations 225. Similarly, if the microphones 242 includes four different microphones, then each microphone may be independently associated with a zone in the listing of device locations 225.

In one or more embodiments, the listing of device locations 225 may include a table that correlates each device with a location, where each location is defined by the area mapping 223. For example, as shown below at Table 4, each device is correlated to a zone, as defined by the area mapping 223, described above. In particular, as illustrated by Table 4, speaker1, microphone1, and a first computing device 204*a* have all been determined to be located within Zone 1. Accordingly, spatial relationships between the devices in the area 202 may be determined using the area mapping 223 and the listing of device locations 225. Of course, the listing of device locations 225 may be maintained in any suitable format, such as, for example, a relational database, a graph database, etc.

TABLE 4

| Device | Location |
|---|---|
| Speaker1 | Zone 1 |
| Microphone1 | Zone 1 |
| Speaker2 | Zone 2 |
| Microphone2 | Zone 2 |
| Computing Device 204a (56:78:A4:76:89:F2) | Zone 1 |
| Computing Device 204b (2F:96:FB:D3:03:17) | Zone 3 |
| Computing Device 204c (11:C8:2E:16:AA:45) | Zone 2 |
| Personal Audio Device 212a (E7:F6:AA:5E:EE:19) | Zone 3 |
| Personal Audio Device 212b (75:49:D5:CB:2F:55) | Zone 2 |

In one or more embodiments, the listing of device locations 225 may be continuously updated by the centralized ANC control system 220. The listing of device locations 225 may be updated periodically (e.g., every minute, 5 minutes, 10 minutes, etc.). In one or more embodiments, the location of a device may be updated whenever it is determined that the device's network path to the centralized ANC control system 220 has changed in some manner. For example, if it is determined that a particular computing device 204*c* is now connected via a different wireless access point 208, then, in response, the location of the computing device 204*c* may be updated within the listing of device locations 225. As another example, if a particular personal audio device 212*b*, previously reported as being connected to a first computing device 204*b*, is reportedly connected to a second computing device 204*c*, then the location of the personal audio device 212*b* may be updated within the listing of device locations 225 to match the location of the second computing device 204*c*.

Accordingly, by way of the area mapping 223, the user/device associations 224, and the device locations 225, the centralized ANC control system 220 may maintain a comprehensive catalog of the topology of the area 202, as well as the locations of devices operating within the area 202, and their proximities to each other.

Still further, as depicted in FIG. 2, the centralized ANC control system 220 is communicatively coupled to an external system 260. As described herein, the external system 260 includes any system operable to output an interrupt signal 263 to the centralized ANC control system 220, where the interrupt signal 263 is generated by the external system 260 based on input other than audio recorded by a microphone within the area 202. The interrupt signal 263 results in the centralized control system 220 identifying a trigger event. For example, the interrupt signal 263 may be generated by the external system 260 in response to a person activating a fire alarm pull station, the detection of smoke by a smoke detector, the activation of a sprinkler system, or the activation of an alarm mechanism (e.g., motion detector, trip wire, etc.) in the area 202. In one or more embodiments, the interrupt signal 263 may be received over a network, such as the Internet, from the external system 260. In this way, the centralized ANC control system 220 may facilitate the suspension of ANC on devices in the area 202 to ensure the safety and wellbeing of any persons in the area 202.

As described in additional detail below, the rule execution logic 226 may leverage one or more of the keyword library 221, the rules library 222, the area mapping 223, the listing of user/device associations 224, and the listing of device locations 225 to identify trigger events. In particular, responsive to metadata received from the sound masking control system 240, the computing devices 204, and the personal audio devices 212, the rule execution logic 226 may evaluate the metadata according to rules of the rules library 222. Such evaluation may rely on the area mappings 223, the user/device associations 224, and the device locations 225 to identify trigger events. In response to identifying a trigger event, the centralized ANC control system 220 may suspend ANC on one or more of the speakers 244 and/or the personal audio devices 212.

Figure 3:
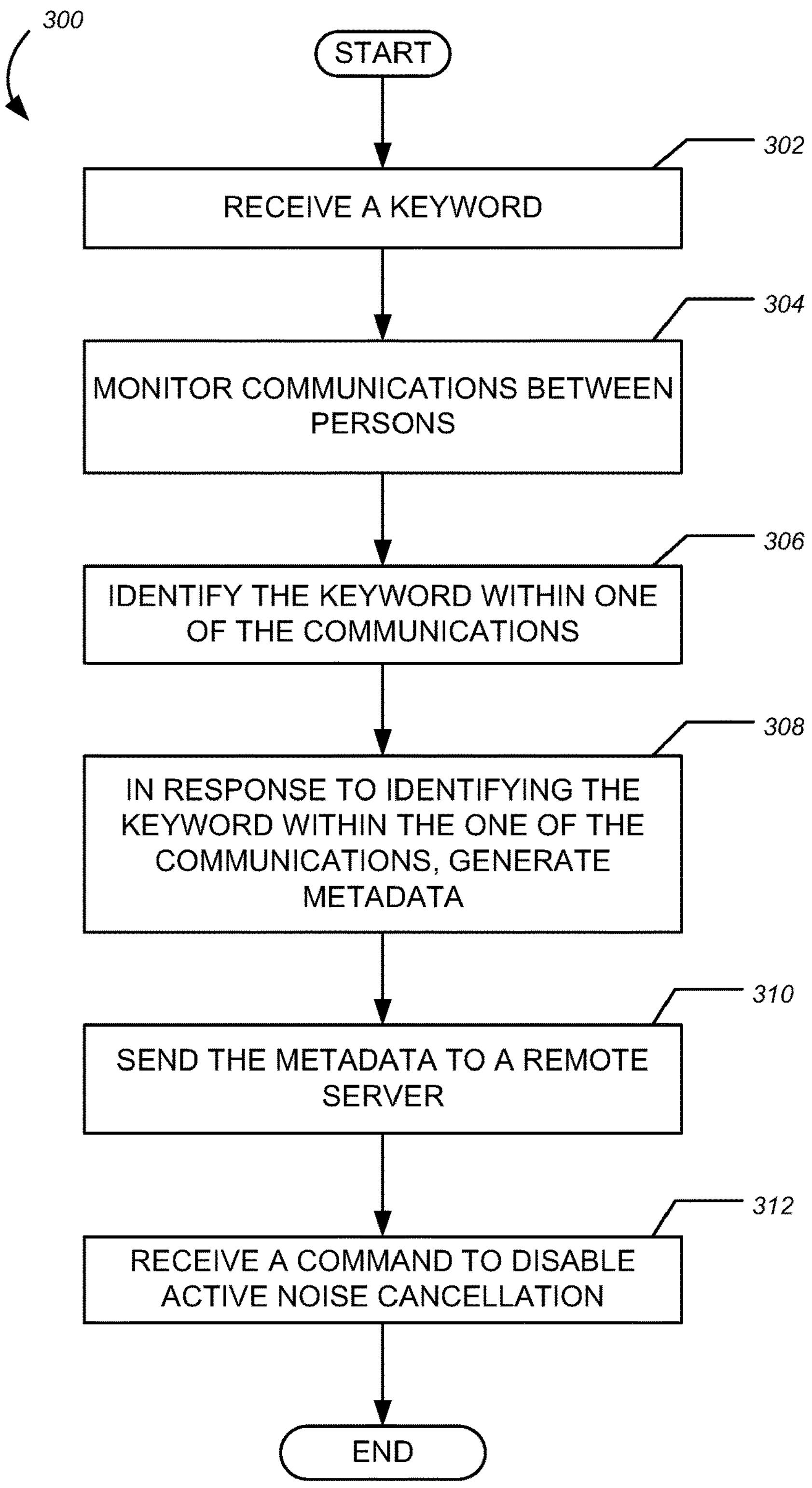
FIG. 3 is a flow diagram showing a method for the centralized control of multiple active noise cancellation devices, in accordance with one or more embodiments of the invention.

FIG. 3 shows a flowchart of a method 300 for the centralized control of multiple ANC devices, in accordance with one or more embodiments of the invention. While the steps of the method 300 are presented and described sequentially, one of ordinary skill in the art will appreciate that some or all of the steps may be executed in a different order, may be combined or omitted, and may be executed in parallel. Accordingly, embodiments of the invention should not be considered limited to the specific arrangements of steps shown in FIG. 3. Furthermore, the steps may be performed actively or passively. For example, some steps may be performed using polling or be interrupt driven in accordance with one or more embodiments of the invention. In one or more embodiments, the method 300 described in reference to FIG. 3 may be practiced using a device operating, at least partially, in a mapped area, such as a computing device 204, a personal audio device 212, or a sound masking control system 240, described in reference to FIG. 2 above.

At step 302, a keyword is received. In one or more embodiments, the keyword may be received from a centralized ANC control system. In particular, the keyword may originate from a keyword library of the centralized ANC control system. The keyword may be one of a plurality of keywords that are received. For example, the centralized ANC control system may maintain a keyword library with hundreds or thousands of keywords, and all or some subset of the keyword library may be received at step 302. As noted above, the keyword may be a name of a person known to exist within an area, such as, for example, an employee that works within a specific office or building. In this way, a computing device 204 or personal audio device 212 may receive only the keywords that are relevant to its zone of operation. As an option, the keyword may be received with a keyword identifier that the keyword is associated with. For example, referencing Table 1, above, the keyword "John" may be received with its keyword identifier "001."

Next, at step 304, communications between persons are monitored. Moreover, at step 306, the keyword is identified within one of the monitored communications. The communications may include verbal communications and/or electronic written communications. In one or more embodiments, the method 300 may be carried out on a personal audio device 212, a computing device 204, or a sound masking control system 240, any of which many include a microphone and hardware processing functionality. Accordingly, via the microphone, communications such as conversations and other verbal utterances may be actively monitored for a content that matches the keyword received at step 302. For example, if the keyword received at step 302 is "John," then speech recognition processing techniques may be applied on an audio signal from a microphone to identify an utterance of the name "John" by a person in proximity to the microphone.

In one or more embodiments, electronic communications, such as instant messages may be actively monitored for content that matches the keyword received at step 302. For example, if the keyword is "do you have a minute to talk," and the method 300 is being carried out on a personal computing device 204, such as a laptop computer, then an instant messaging application may be monitored for the occurrence of the keyword. In such an example, if one person sends an instant message that includes "do you have a minute to talk?" to another person, then the keyword will be identified within the message.

Further, metadata is generated, at step 308, in response to identifying the keyword within the communication. The metadata may include the keyword, or a keyword identifier associated with the keyword. Accordingly, the metadata includes data that describes some aspect of communication, and may include data that describes circumstances or conditions present during the communication. For example, if the keyword was detected via a microphone, the metadata may include the current volume level of the environment when the keyword was detected via the microphone. In one or more embodiments, the metadata may include a device identifier of the device that identified the keyword in the communication. For example, the metadata may include a serial number of a headset or microphone that has identified a spoken keyword. As another example, the metadata may include a MAC address or IP address of a computing device that identified the keyword in an electronic communication.

The metadata is sent to a remote server at step 310. In one or more embodiments, the remote server includes a centralized ANC control system, such as the centralized ANC control system 220, described in reference to FIG. 2. The metadata may be sent to the remote server over a network.

Also, at step 312, a command to disable ANC is received. The command may be received over a network. The command includes any instruction or signal that causes a recipient device to disable an ANC technique that is enabled at the time of receiving the command. For example, if the command is received by a headset, then the headset may cease generating anti-phase noise. Also, if the command is received by a sound masking control system, then the sound masking control system may, at one or more speakers, stop outputting background noise that reduces the perception of environmental noise.

In one or more embodiments, the command may originate from the remote server that was the recipient of the metadata sent at step 310. As described below, the remote server may continuously receive such metadata from multiple devices operating in a given area. In this way, the remote server may monitor communications occurring between persons in the area. Further, responsive to the metadata that the remote server receives from various devices, the remote server may disable ANC on one or more of those devices in a manner that facilitates communications between persons in the area.

In one or more embodiments, upon receiving the command to disable ANC at step 312, the receiving device may immediately disable ANC in accordance with the command. However, in one or more embodiments, the device may issue a user prompt before disabling ANC. For example, the device may ask a user, by way of a graphical user interface or voice prompt, whether ANC should be disabled. More specifically, if the device is a headset, then the user may hear a prompt from a speaker of the headset, that requests confirmation for disabling ANC of the headset. The user may confirm that ANC can be disabled by way of a verbal response, or by interaction with a user-operable control of the headset.

Additionally, in one or more embodiments, once ANC is disabled, the disabling device may begin monitoring for a condition that allows the device to re-enable ANC. For example, if a keyword is identified within a verbal communication at step 306, then the condition may include a maximum volume level at a microphone input for a minimum period of time. More specifically, a headset or sound masking control system may monitor for the occurrence of a 30 second time period in which all input at a monitored microphone is below a threshold volume level (e.g., 50 dB, 60 dB, etc.). As another example, if a keyword is identified within a written electronic message at step 306, then the condition may include a minimum period of inactivity. In particular, a computing device may monitor for the occurrence of a two-minute time period in which no further instant messages are exchanged between persons.

In one or more embodiments, the device may issue a user prompt before re-enabling ANC. For example, the device may ask the user, by way of a graphical user interface or voice prompt, whether ANC should be re-enabled. In such embodiments, the ANC may be re-enabled after the user has responded to the prompt in an affirmative manner, or after the user has failed to respond for a predetermined period of time (e.g., 30 seconds, 60 seconds, etc.).

Figure 4A:
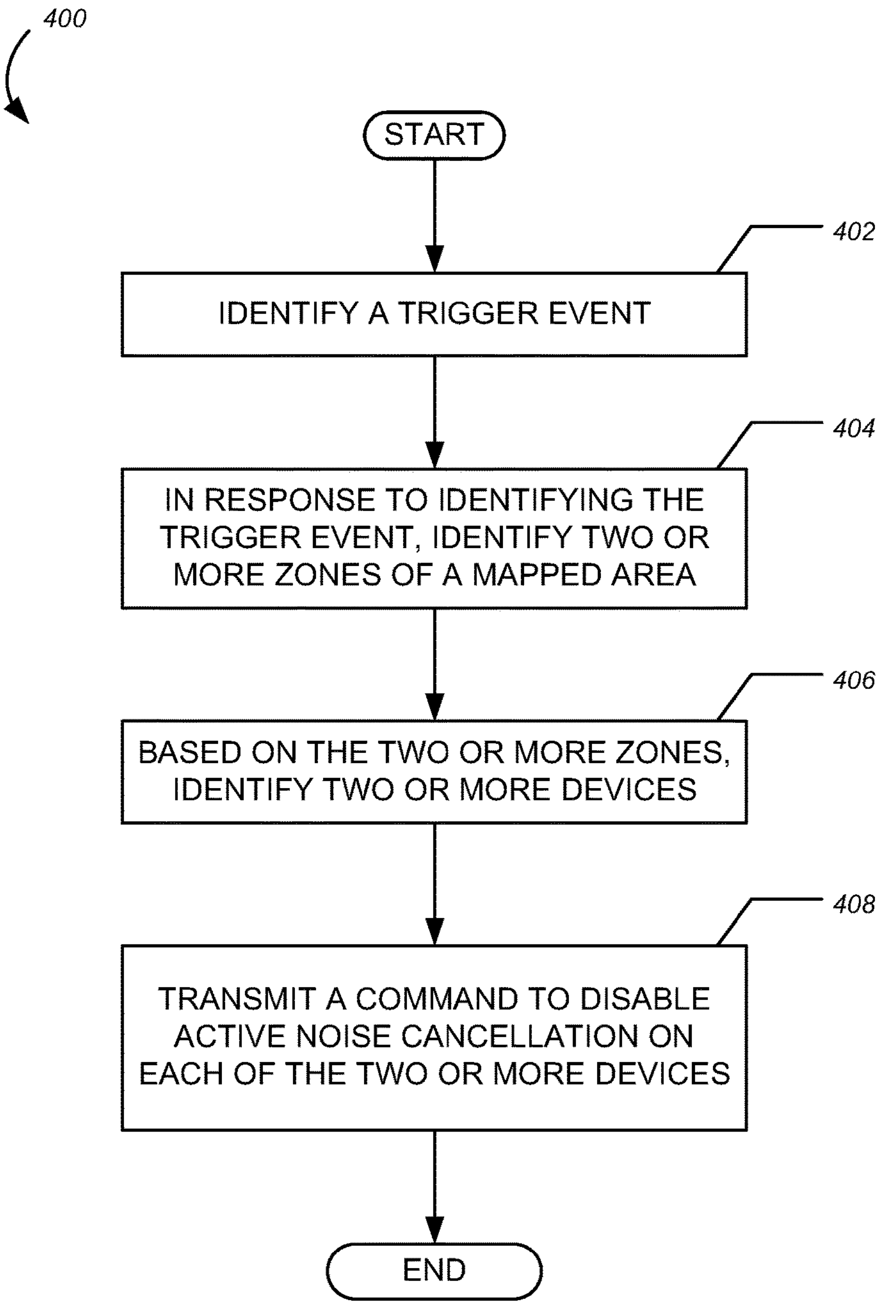
FIGS. 4A, 4B, and 4C are flow diagrams showing methods for the centralized control of multiple active noise cancellation devices, in accordance with one or more embodiments of the invention.

FIG. 4A shows a flowchart of a method 400 for the centralized control of multiple ANC devices, in accordance with one or more embodiments of the invention. While the steps of the method 400 are presented and described sequentially, one of ordinary skill in the art will appreciate that some or all of the steps may be executed in a different order, may be combined or omitted, and may be executed in parallel. Accordingly, embodiments of the invention should not be considered limited to the specific arrangements of steps shown in FIG. 4A. Furthermore, the steps may be performed actively or passively. For example, some steps may be performed using polling or be interrupt driven in accordance with one or more embodiments of the invention. In one or more embodiments, the method 400 described in reference to FIG. 4A may be practiced using the centralized ANC control system 220, described in reference to FIG. 2 above.

Referring to FIG. 4A, a trigger event is identified at step 402. In one or more embodiments, the trigger event may be identified by executing one or more rules of a rules library against metadata. Further, prior to execution of any rule, the metadata may be received from a device. For example, the metadata may be received from a personal audio device, computing device, or sound masking control system, any of which may be monitoring communications within a mapped area. The mapping of the area may include any analysis of the area that generates an area mapping. The area mapping may include topology and location data describing the area. Further, such analysis may result in the generation of a listing of user/device associations, as well as device locations.

In one or more embodiments, the trigger event may be identified, at step 402, in response to receiving a control signal or interrupt. The control signal or interrupt may originate from an external system. For example, the trigger event may be identified in response to an interrupt from an alarm system, fire detection system, announcement broadcast system, etc.

In response to identifying the trigger event, two or more zones of a mapped area are identified at step 404. In one or more embodiments, the zones of the mapped area may be identified using the trigger event. For example, the trigger event may specifically identify the two or more zones (e.g., "Zone 1, Zone 3," etc.). In one or more embodiments, the zones of the mapped area may be identified using metadata that resulted in the identification of the trigger event. For example, if the trigger event is identified in response to evaluating a rule against received metadata, then at least one of the zones may be identified based on a source of the metadata. More specifically, if the metadata is transmitted by a device located in Zone 1, then the zones identified at step 404 may include Zone 1. Furthermore, if the metadata describes the occurrence of a keyword, then the keyword may be used to identify another of the zones. In other words, a zone may be identified based on a content of the metadata. For example, if the identified keyword is "Harry," it may be determined, using a listing of user/device associations and a listing of device locations, that a person named Harry is located in Zone 3. More specifically, Harry may be associated with a computing device or personal audio device that is currently within Zone 3. Accordingly, Zone 1 and Zone 3 may be identified based on the metadata. Still further, using an area mapping, it may be determined that Zone 2 is located between Zone 1 and Zone 3. More specifically, and referring to Table 2 above, it may be determined that Zone 2 at (0,1) is located between Zone 1 at (0,0) and Zone 3 at (0,2). Accordingly, all of Zone 1, Zone 2, and Zone 3 may be identified at step 404.

Also, based on the two or more zones of the mapped area identified at step 404, two or more devices are identified, at step 406. In one or more embodiments, the two or more devices may be speakers that are controlled by a sound masking control system, such as the sound masking control system 240, described in reference to FIG. 2. As an option, the identified two or more devices may include all speakers controlled by the sound masking control system that are operational within the zones identified at step 404. In one or more embodiments, the two or more devices may be personal audio devices, such as headphones or headsets, that are within the identified zones of the mapped area. Furthermore, in such embodiments, the personal audio devices may be identified based on the trigger event, or metadata used to identify the trigger event. For example, and continuing the example above, if John says Harry's name, resulting in the identification of the trigger event at step 402, then devices associated with John and Harry or proximate to John and Harry, and within Zones 1 and 3, may be identified at step 406.

The devices may be identified, at step 406, using a listing of device locations that correlates each of a number of devices to a zone. Any of the devices within the listing of device locations may include ANC technology. Any of the devices within the listing of device locations may have ANC technology that is currently enabled. Accordingly, any of the devices identified at step 406 may have ANC currently enabled. As an option, only devices with ANC capabilities, or ANC currently enabled, may be identified at step 406.

At step 408, a command is transmitted to disable ANC on each of the two or more devices identified at step 406. The command may include any instruction that results in ANC being disabled on the devices. The command may be transmitted over a network.

In one or more embodiments, the devices identified at step 406 may include speakers that are controlled by a sound masking control system. Accordingly, the command may be transmitted to the sound masking control system. Disabling the ANC on such devices includes any operation that reduces or halts the background noise introduced by the identified speakers. In such embodiments, a command may identify a speaker that should be disabled by way of a unique device identifier associated with the speaker. A single command may be transmitted that identifies all of the speakers, or each speaker may be addressed separately, such that a different command is transmitted for each speaker. As an option, the command may identify the zones for which ANC should be disabled, and the sound masking control system that receives the command may, in response to receiving the command, disable the speakers in the identified zones.

In one or more embodiments, if a sound masking control system receives a command to disable ANC on one or more speakers, then the sound masking control system may request confirmation from one or more users within the same zone(s) as the speakers on which ANC will be disabled. For example, if a sound masking control system receives a command to disable ANC on a speaker in Zone 4, then the sound masking control system may first request confirmation from a person in Zone 4. In particular, a user may be prompted via a notification or window in a graphical user interface of a computing device to confirm that ANC of the speaker in Zone 4 should be disabled. The user may be proximate to a device from which metadata originated that is causing the ANC to be disabled. In one or more embodiments, such a prompt may be initiated by a centralized ANC control system, before transmitting the command at step 408.

In one or more embodiments, the devices identified at step 406 may include personal audio devices. Accordingly, in such embodiments, a command to disable ANC may be sent to each of the identified personal audio devices. A transmitted command may specifically identify a recipient personal audio device using a device identifier that is uniquely associated with the device.

Figure 4B:
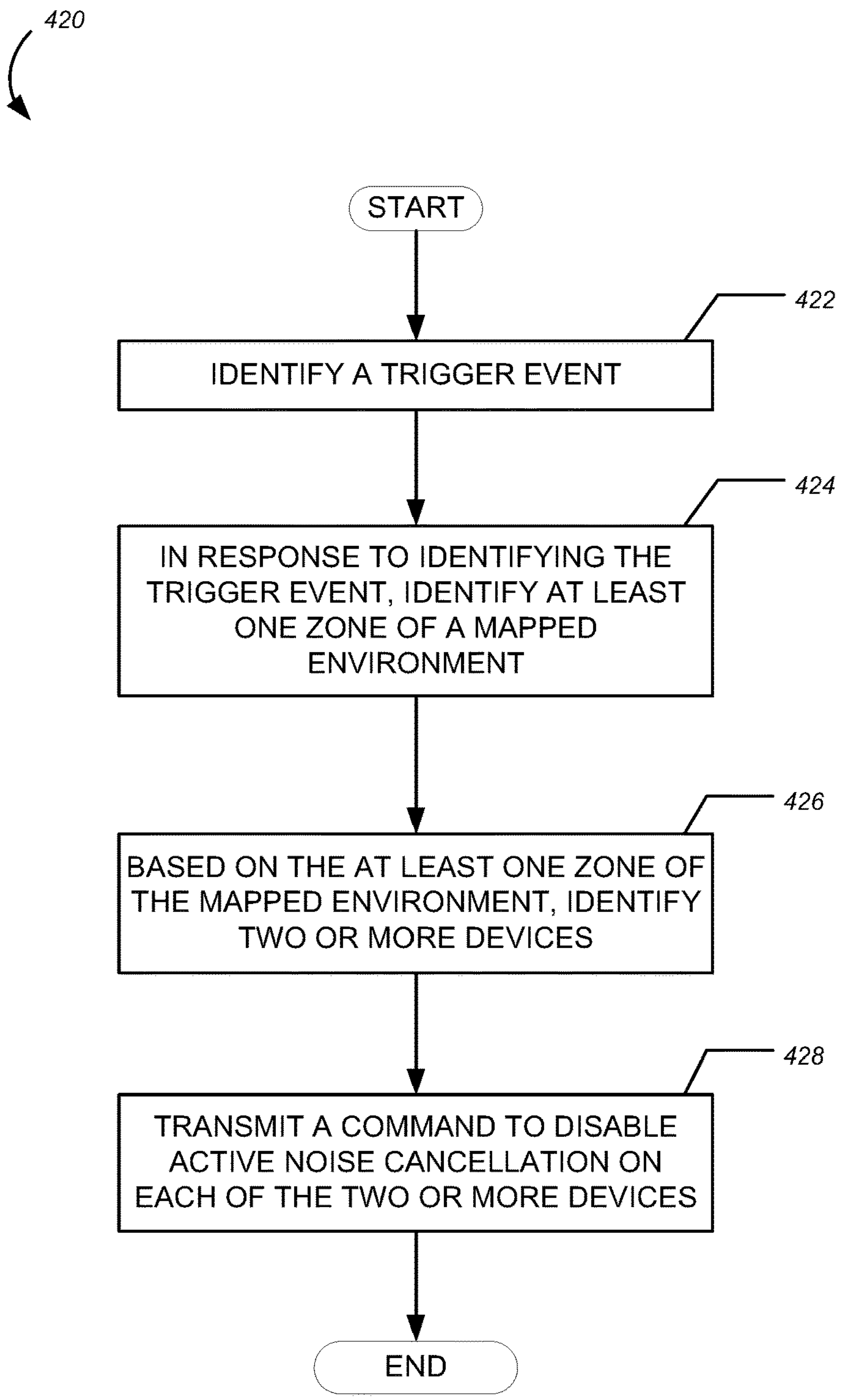

FIG. 4B shows a flowchart of a method 420 for the centralized control of multiple ANC devices, in accordance with one or more embodiments of the invention. While the steps of the method 420 are presented and described sequentially, one of ordinary skill in the art will appreciate that some or all of the steps may be executed in a different order, may be combined or omitted, and may be executed in parallel. Accordingly, embodiments of the invention should not be considered limited to the specific arrangements of steps shown in FIG. 4B. Furthermore, the steps may be performed actively or passively. For example, some steps may be performed using polling or be interrupt driven in accordance with one or more embodiments of the invention. In one or more embodiments, the method 420 described in reference to FIG. 4B may be practiced using the centralized ANC control system 220, described in reference to FIG. 2 above.

A trigger event is identified at step 422. In one or more embodiments, the trigger event may be identified by executing one or more rules of a rules library against metadata. Further, prior to execution of any rule, the metadata may be received from a device. For example, the metadata may be received from a personal audio device, computing device, or sound masking control system, any of which may be monitoring communications within a mapped area. In one or more embodiments, the trigger event may be identified, at step 422, in response to receiving a control signal or interrupt signal. The control signal or interrupt signal may originate from an external system.

In response to identifying the trigger event, at least one zone of a mapped area is identified at step 424. In one or more embodiments, the zone or zones of the mapped area may be identified using the trigger event. For example, the trigger event may specifically identify a zone (e.g., "Zone 4," etc.). In one or more embodiments, the zone or zones of the mapped area may be identified at step 424 using metadata that caused the identification of the trigger event. The metadata may specifically designate a zone, or a zone may be determined based on an origin of the metadata. For example, if the trigger event is identified in response to evaluating a rule against received metadata, then a zone may be identified based on a source of the metadata. Also, if the trigger event includes a control signal or interrupt, then the at least one zone may be predetermined. For example, a specific set of zones, or all zones in a particular area, may be identified at step 424 in response to a control signal or interrupt from an external source, such as an alarm system or fire detection system.

Also, based on the one or more zones of the mapped area identified at step 424, two or more devices are identified, at step 426. In one or more embodiments, the two or more devices may include speakers that are controlled by a sound masking control system. As an option, the identified two or more devices may include all speakers controlled by the sound masking control system that are operational within the zones identified at step 424. In one or more embodiments, the two or more devices may include personal audio devices, such as headphones or headsets, that are within the identified zones of the mapped area. As an option, the identified two or more devices may include all personal audio devices with ANC that can be identified as operating within the zones identified at step 424.

The devices may be identified, at step 426, using a listing of device locations that correlates each of a number of devices to a zone. Any of the devices within the listing of device locations may include ANC technology. Any of the devices within the listing of device locations may have ANC technology that is currently enabled. Accordingly, each of the devices identified at step 426 may have ANC currently enabled. As an option, only devices with ANC capabilities, or ANC currently enabled, may be identified at step 426.

At step 428, a command is transmitted to disable ANC on each of the two or more devices identified at step 426. The command may include any instruction that results in ANC being disabled on the devices. The command may be transmitted over a network. The command transmitted at step 428 may be substantially identical to the command transmitted at step 408, previously described in reference to FIG. 4A.

Accordingly, by way of the methods 400 and 420 described above, a centralized ANC control system may, responsive to data describing the interactions occurring in a mapped area, dynamically suspend ANC on any device operating within the area.

Figure 4C:
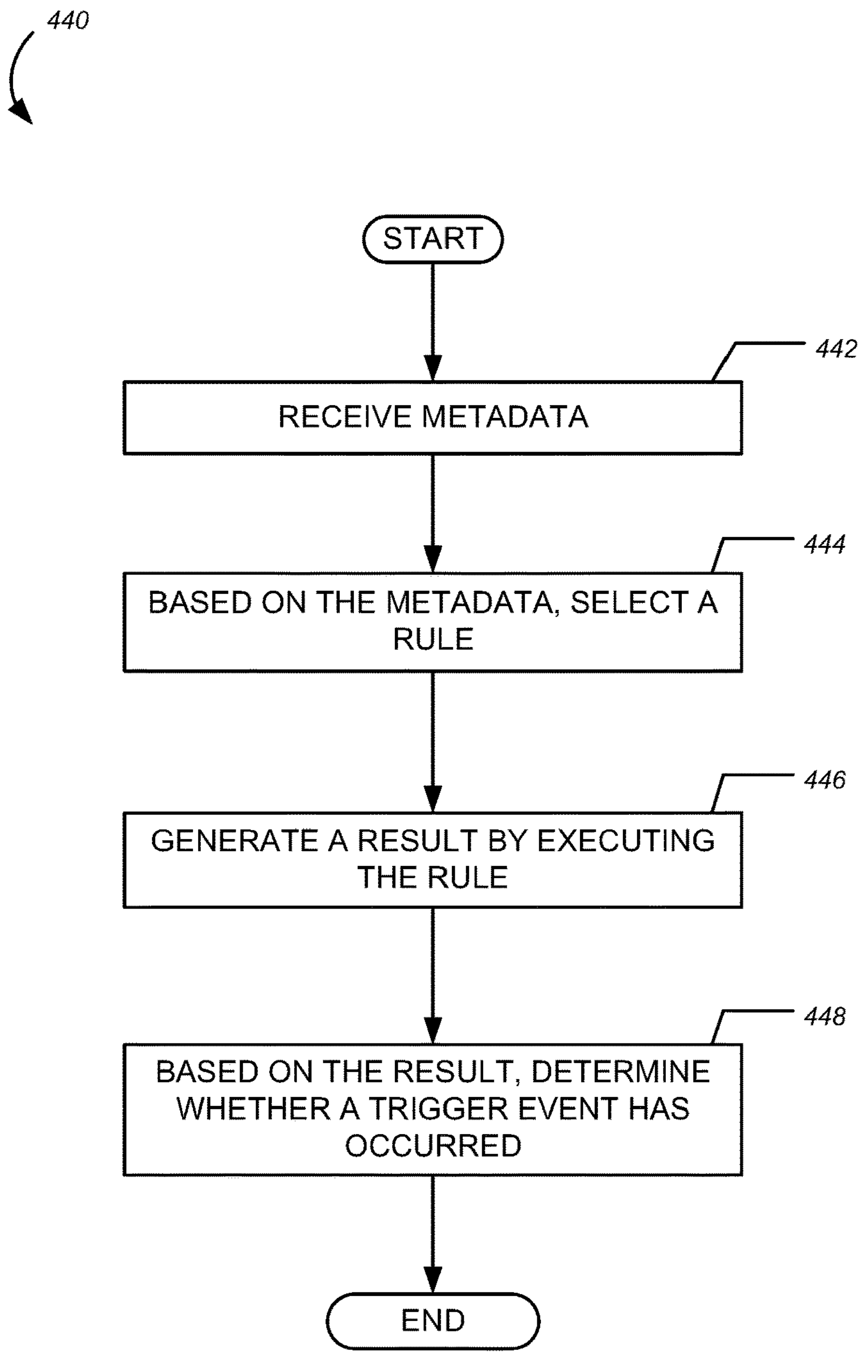

FIG. 4C shows a flowchart of a method 440 for identifying a trigger event during the centralized control of multiple active noise cancellation devices, in accordance with one or more embodiments of the invention. While the steps of the method 440 are presented and described sequentially, one of ordinary skill in the art will appreciate that some or all of the steps may be executed in a different order, may be combined or omitted, and may be executed in parallel. Accordingly, embodiments of the invention should not be considered limited to the specific arrangements of steps shown in FIG. 4C. Furthermore, the steps may be performed actively or passively. For example, some steps may be performed using polling or be interrupt driven in accordance with one or more embodiments of the invention. In one or more embodiments, the method 440 described in reference to FIG. 4C may be practiced using the centralized ANC control system 220, described in reference to FIG. 2 above. In particular, the method 440 may be carried out during the identification of a trigger event at steps 402 or 422, of methods 400 and 420, respectively.

At step 442, metadata is received. The metadata includes any data that describes a communication, electronic or verbal, initiated by a person in a mapped area. The metadata may be received from a personal audio device, a computing device, or sound masking control system, any of which may be monitoring communications within the mapped area. In one or more embodiments, the metadata may include an identifier of the origin of the metadata. For example, if the metadata is received from a computing device, then the metadata may include a device identifier of the computing device. As another example, if the metadata is received from a sound masking control system based on a communications monitored by a microphone, then the metadata may include an identifier of the microphone. In one or more embodiments, the metadata may include a keyword or keyword identifier. Still yet, the metadata may include a power level of a detected audio signal, a timestamp of a communication, a zone that the communication occurred within, or other information that describes some aspect of the communication.

Based on the metadata, a rule is selected at step 444. The rule may be selected based on any aspect of the metadata. In one or more embodiments, the rule may be selected based on the origin of the metadata and/or an identified keyword. For example, if the metadata indicates that the keyword "John" was detected as a verbal utterance by a personal audio device, then the rule selected at step 444 may be a rule used to identify trigger events based on the verbal utterance of employee names. As another example, if the metadata indicates that John sent an instant message to Harry asking "do you have a minute to chat?," then the rule selected at step 444 may be a rule used to identify trigger events based on electronic communications between employees.

In one or more embodiments, the rule selected at step 444 may include a condition based on the physical proximity of communicating persons. For example, the rule may require that two persons verbally communicating are within 10 meters of each other, 20 meters of each other, 3 zones of each other, etc. In one or more embodiments, the rule may include a condition based on day and/or time. For example, the rule may only apply to communications that occur outside of the hours of 9 AM-5 PM, Monday-Friday. In one or more embodiments, the rule may include a condition based on environmental noise levels. For example, the rule may require an environmental noise level in excess of 50 dB. Still yet, any of these conditions may be combined in a single rule. For example, a rule may require that two persons verbally communicating with each other during the hours of 12 PM-1 PM are within 5 meters of each other, and the volume of environmental noise is at least 60 dB. In one or more embodiments, the rule may include a condition based on area topology. For example, the rule may require that no wall exists between individuals that are verbally communicating.

At step 446, the rule is executed to generate a result. In one or more embodiments, the rule may be executed using, at least in part, a content of the metadata. For example, the rule may be evaluated against an identifier of the origin of the metadata, device identifier, keyword identifier, etc., any of which may be included in the metadata.

In one or more embodiments, the rule may be executed using, at least in part, information obtained from an area mapping, a listing of user/device associations, and/or a listing of device locations. For example, if the selected rule requires that two persons verbally communicating are within 10 meters or 3 zones of each other, then a first person that is a party to a communication may be determined based on the origin of the metadata. In particular, if the metadata originates from a device being used by John, then a location of John's devices (and John himself) may be determined using a listing of user/device associations and a listing of device locations. Further, if the metadata indicates that John has said the name "Harry," or instant messaged Harry to ask Harry if he has some time to chat, then a location of Harry's devices (and Harry himself) may be similarly determined using the listing of user/device associations and the listing of device locations. Based on these two locations, it can be determined whether John and Harry are within 10 meters or 3 zones of each other. Accordingly, if the devices of John and Harry are within 10 meters or 3 zones of each other, the result may indicate that the rule has executed successfully. However, if the devices of John and Harry are not within 10 meters or 3 zones of each other, the result may indicate that the rule did not execute successfully. Such a rule can be extended to include conditions directed to an environmental noise level, the presence of a wall between the parties, or a time of the communication, as set forth above.

Based on the result, it is determined, at step 448, whether a trigger event has occurred. In one or more embodiments, if the rule executes successfully, then a trigger event has occurred. Conversely, if the rule fails to execute successfully, then a trigger event has not occurred. In one or more embodiments, multiple rules may be selected and executed at steps 444-446. In such embodiments, the successful execution of any of the rules may result in the occurrence of a trigger event, or the successful execution of all selected rules may be required for the occurrence of a trigger event. The rules may be configured based on circumstantial conditions for the area in which they will be applied. For example, different rules may be configured for a factory floor than would be configured for an office environment.

Figure 5A:
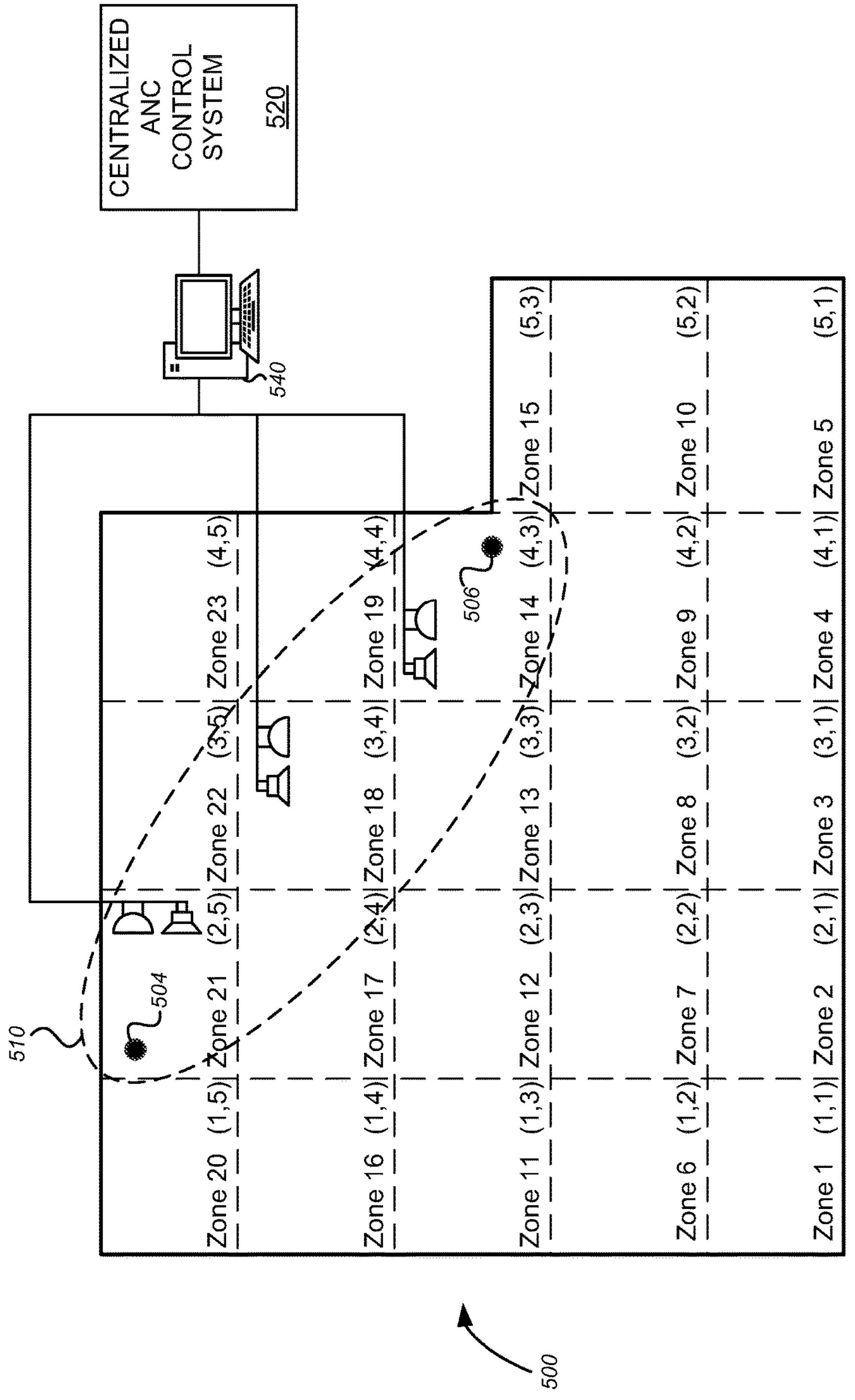
FIGS. 5A and 5B depict examples of the centralized control of multiple active noise cancellation devices, in accordance with one or more embodiments of the invention.

FIG. 5A shows an example of the centralized control of multiple active noise cancellation devices, in accordance with one or more embodiments of the invention. This example may be carried out by the systems and devices of FIG. 2 according to the methods 300, 400, and 440 described above, in reference to FIGS. 3, 4A, and 4C, respectively.

As depicted by FIG. 5A, an office area 500 has been mapped such that it includes 23 different zones. A spatial relationship between any two zones in the area 500 may be determined based on a set of coordinates associated with each zone. For example, it can be determined that Zone 23 at (4,5) is adjacent to Zone 19 at (4,4). The relationships between the various zones and their positions is recorded in an area mapping for the area 500, which may be stored at a centralized ANC control system 520.

Each of the zones may include a corresponding microphone that is communicatively coupled to a sound masking control system 540. The sound masking control system 540 includes a noise level management application that receives audio signals from the microphones in the area 500. Similarly, each of the zones may include a corresponding speaker that is communicatively coupled to the sound masking control system 540. The sound masking control system 540 transmits sound masking audio signals, also referred to as ANC, to the speakers in the area 500. The sound masking control system 540 may operate under the control of the centralized ANC control system 520 to suspend the ANC of the speakers in the area 500. For purposes of clarity, only speakers and microphones within Zone 14, Zone 18, and Zone 21 are illustrated in FIG. 5A.

Furthermore, as depicted in FIG. 5A, a first person 504 is located within Zone 21 of the area 500, and a second person 506 is located within Zone 14 of the area 500. This information is determined using a listing of user/device associations, and a listing of device locations, which may be stored at the centralized ANC control system 520. In particular, the location of the first person 504 may be determined based on a computing device or personal audio device that is associated with the first person 504, and registered in the listing of user/device associations and the listing of device locations. Similarly, the location of the second person 506 may be determined based on a computing device or personal audio device that is associated with the second person 506, and registered in the listing of user/device associations and the listing of device locations.

Additionally, the sound masking control system 540 has received a listing of keywords from the centralized ANC control system 520. In particular, the listing of keywords includes the name of the first person 504 ("Frank"), the name of the second person 506 ("Peter"), and the phrase "do you have a minute to talk."

The microphone in Zone 21 continually monitors and returns an audio signal to the sound masking control system 540. Accordingly, when Frank announces "hey, Peter, are you free for a second?," the microphone in Zone 21 returns this utterance to the sound masking control system 540. In turn, the sound masking control system 540 analyzes Frank's speech to identify the occurrence of any keywords within, and determines a match has occurred (i.e., "Peter"). In response, the sound masking control system 540 generates metadata that identifies the particular keyword ("Peter") that was matched. Also, the metadata identifies the origin as "Zone 21," or a unique identifier of the microphone in Zone 21. The sound masking control system 540 sends this metadata to the centralized ANC control system 520.

In response to receiving the metadata from the sound masking control system 540, the centralized ANC control system 520 determines that the matched keyword "Peter" is the name of an employee working in Zone 14. As noted above, this may be determined using, for example, a listing of user/device associations and a listing of device locations. Moreover, the centralized ANC control system 520 executes a rule to determine whether a trigger event has occurred. In particular, the rule is configured to facilitate the verbal interactions of individuals that are no further than 12 meters from each other. A condition in the rule may explicitly set forth such a requirement. Using an area mapping of the area 500, the centralized ANC control system 520 determines that Zone 21 and Zone 14 are within 10 meters of each other. Accordingly, a trigger event is identified in response to the successful execution of the rule by the centralized ANC control system 520. In response to identifying the trigger event, the centralized ANC control system 520 transmits a command to the sound masking control system 540. The command identifies the speakers in Zone 21, Zone 18, and Zone 14, and instructs that ANC should be disabled on each of these speakers. Although neither Frank nor Peter are currently working in Zone 18, the centralized ANC control system 520 determines, using the area mapping, that Zone 18 is located between Zone 21 and Zone 14; and, accordingly, continued ANC in Zone 18 would interfere with their verbal communications. In response to receiving the command, the sound masking control system 540 halts further transmission of sound masking audio signals by the speakers in each of Zone 14, Zone 18, and Zone 21. In this way, a tunnel 510 is created, within which ANC is temporarily suspended, and Frank and Peter may communicate with increased ease and efficiency.

A similar result may be achieved by a trigger event that is initiated due to written electronic communication. In particular, if Frank were send an instant message to Peter that includes the phrase "do you have a minute to talk?," an application executing on the computing device of either Frank or Peter may identify the occurrence of this keyword (i.e., "do you have a minute to talk"). Further, the application may generate metadata that includes the keyword, and transmit the metadata to the centralized ANC control system 520. In turn, the centralized ANC control system 520 may utilize the metadata to identify a trigger event, and transmit a command to the sound masking control system 540, to disable ANC for the speakers in Zone 14, Zone 18, and Zone 21, as described above. This may be particularly beneficial if both Frank and Peter wear headsets while they are working, and are generally unable to hear each other while ANC remains active in Zone 14, Zone 21, and intermediate Zone 18. However, with ANC disabled, Frank and Peter may easily exchange a few sentences without shouting, or physically traversing the area 500.

Figure 5B:
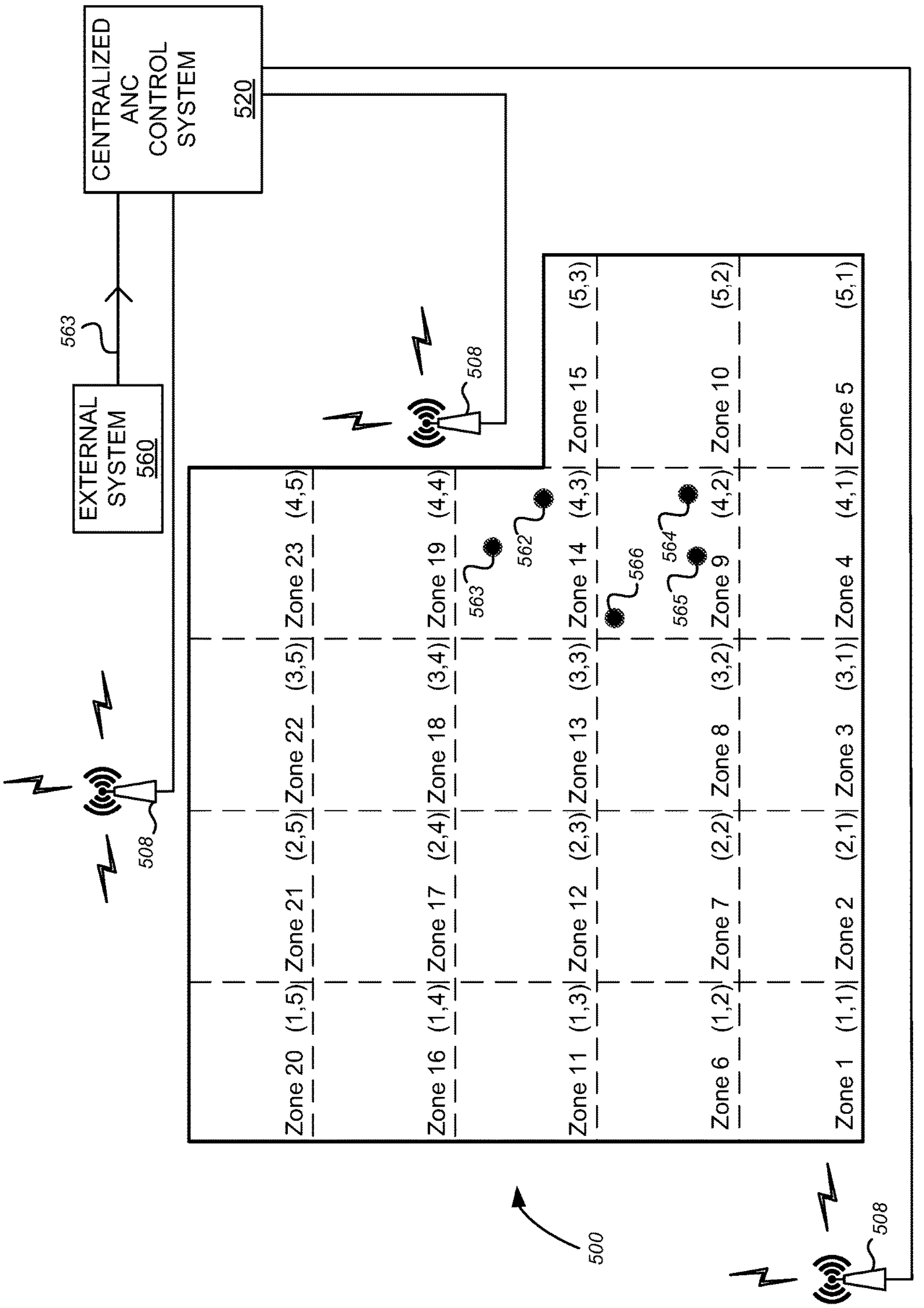

FIG. 5B shows an example of the centralized control of multiple active noise cancellation devices, in accordance with one or more embodiments of the invention. This example may be carried out by the systems and devices of FIG. 2 according to the methods 300 and 420, described above, in reference to FIGS. 3 and 4B, respectively.

As shown in FIG. 5B, the centralized ANC control system 520 is communicatively coupled to an external system 560. Also, the centralized ANC control system 520 is communicatively coupled to access points 508, which provide wireless links to computing devices and personal audio devices within the area 500. As shown in FIG. 5B, the mapping and topology of the area 500 of FIG. 5B is substantially identical to the area 500 described in FIG. 5A. The locations of personal computing devices and/or personal audio devices operating within the area 500 have been determined and recorded to a listing of device locations, which may be maintained at the centralized ANC control system 520. In particular, the listing of device locations lists personal audio devices 562 and 563 as operating within Zone 14, and personal audio devices 564-566 as operating within Zone 9. The locations of the personal audio devices 562-566 may be determined based on known ranges of the wireless access points 508, triangulation algorithms, known locations of networking ports in the area 500, pairings or connections between the personal audio devices 562-566 and host computing devices, etc., as described above.

The centralized ANC control system 520 receives an interrupt signal 563 from the external system 560. In response to receiving the interrupt signal 563 from the external system 560, the centralized ANC control system 520 identifies a trigger event. The external system may be a paging or alert system, a fire detection system, a security system, etc. Further, in response to identifying the trigger event, the centralized ANC control system 520 identifies at least one zone of the area 500. The identified zones may comprise all zones in the area 500. For example, all of Zones 1-23 may be identified. Zones 1-23 may represent the entirety of a floor or building of the area 500. The identified zones may comprise all zones in the area 500 with active personal audio devices, as tracked in a listing of device locations at the centralized ANC control system 520. For example, Zone 14 and Zone 9 may be identified, where, according to a listing of device locations at the centralized ANC control system 520, only Zone 14 and Zone 9 currently include active personal audio devices (i.e., the personal audio devices 562-566). Still yet, the identified zones may comprise only zones in the area 500 that contain devices on which ANC is currently enabled. Accordingly, the zones may be determined using a listing of device locations, and/or a listing of user/device associations.

After identifying one or more particular zones of the area 500, the centralized ANC control system 520 identifies personal audio devices within the particular zones. In particular, the centralized ANC control system 520 identifies personal audio devices 562-566. As an option, the personal audio devices 562-566 may be identified because each of the personal audio devices 562-566 has been registered with the centralized ANC control system 520 as a device with ANC capabilities; or the personal audio devices 562-566 may be identified because each of the personal audio devices 562-566 has reported to the centralized ANC control system 520 that ANC is currently enabled thereon. After identifying the personal audio devices 562-566, the centralized ANC control system 520 transmits commands to disable ANC on the personal audio devices 562-566. For example, the centralized ANC control system may address each of the personal audio devices 562, 563, 564, 565, and 566 via separate instructions. In response to receiving a command to disable ANC, each of the personal audio devices 562-566 suspends its ANC. As a result, persons wearing the personal audio devices 562-566 may be able to hear an alarm system, announcement, or other alert that is being broadcast in the area 500. Subsequently, the centralized ANC control system 520 may broadcast a resume signal to the personal audio devices 562-566. In response to the resume signal, ANC may be resumed on each of the personal audio devices 562-566.

Thus, in the manner described above, the centralized ANC control system 520 may augment an external paging or alarm system. In particular, the centralized ANC control system 520 may be made aware that a paging announcement or alarm notification has started, or will be starting. The centralized ANC control system 520 may use the information it tracks regarding personal audio devices operating in the area 500, as well as the capabilities of such personal audio devices, to ensure important communications reach persons that might not otherwise hear such communications. This may be important for ensuring the safety and well-being of individuals within the area 500.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method, comprising:

receiving metadata from a sound masking control system;

identifying a trigger event based on the metadata;

in response to identifying the trigger event, identifying two or more zones of a mapped area;

based on the two or more zones, identifying two or more devices; and transmitting a command to disable active noise cancellation on each of the two or more devices.

2. The method of claim 1, wherein the metadata is generated by the sound masking control system based on communications monitored in the mapped area.

3. The method of claim 1, comprising receiving second metadata from a personal audio device in the mapped area, wherein a second trigger event is identified based on the second metadata.

4. The method of claim 3, wherein the personal audio device includes one of a headset and a headphone.

5. The method of claim 1, comprising:

identifying at least one zone of the two or more zones based on a source of the metadata; and identifying another zone of the two or more zones based on a content of the metadata.

6. A system for centralized control of active noise cancellation, comprising:

an area mapping of an indoor environment;

a keyword library;

a listing of user and device associations;

a listing of device locations;

at least one processor; and memory coupled to the at least one processor, the memory having stored therein instructions which when executed by the at least one processor, cause the at least one processor to perform a process including:

receiving metadata, from a sound masking control system based on an utterance detected within the indoor environment by the sound masking control system, that identifies a keyword of the keyword library, based on the metadata, identifying a trigger event, in response to identifying the trigger event, identifying, using the area mapping, two or more zones of the indoor environment;

based on the two or more zones, identifying, using the listing of user and device associations and the listing of device locations, two or more devices; and transmitting a command to disable active noise cancellation on each of the two or more devices.

7. The system of claim 6, wherein the area mapping comprises a data record that describes spatial relationships between the two or more zones of the indoor environment.

8. The system of claim 6, wherein the listing of device locations comprises a data record that correlates each device of the two or more devices with a zone of the indoor environment.

9. The system of claim 6, wherein the listing of user and device associations comprises a data record that correlates a person with at least one of a computing device within the indoor environment and a personal audio device within the indoor environment.

10. The system of claim 6, wherein the instructions of the memory, when executed by the at least one processor, cause the at least one processor to perform the process including: receiving second metadata from a personal audio device based on an utterance detected by the personal audio device.

11. The system of claim 6, wherein the instructions of the memory, when executed by the at least one processor, cause the at least one processor to perform the process including: receiving second metadata from a computing device based on an electronic message sent between two computing devices within the indoor environment.

* * * * *